(12) United States Patent
Aso et al.

(10) Patent No.: US 12,037,454 B2
(45) Date of Patent: *Jul. 16, 2024

(54) POLYAMIDE RESIN COMPOSITION

(71) Applicant: TOYOBO MC Corporation, Osaka (JP)

(72) Inventors: Hideo Aso, Yamaguchi (JP); Shuji Kubota, Osaka (JP); Yoshitaka Ayuzawa, Shiga (JP)

(73) Assignee: TOYOBO MC CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/440,363

(22) PCT Filed: Mar. 12, 2020

(86) PCT No.: PCT/JP2020/010826
§ 371 (c)(1),
(2) Date: Sep. 17, 2021

(87) PCT Pub. No.: WO2020/189502
PCT Pub. Date: Sep. 24, 2020

(65) Prior Publication Data
US 2022/0162381 A1 May 26, 2022

(30) Foreign Application Priority Data
Mar. 20, 2019 (JP) .................................. 2019-052998

(51) Int. Cl.
C08G 63/00 (2006.01)
C08G 69/00 (2006.01)
C08K 13/02 (2006.01)
C08K 3/34 (2006.01)
C08K 5/098 (2006.01)
C08K 5/544 (2006.01)

(52) U.S. Cl.
CPC .............. C08G 69/00 (2013.01); C08K 13/02 (2013.01); C08K 3/346 (2013.01); C08K 5/098 (2013.01); C08K 5/544 (2013.01)

(58) Field of Classification Search
CPC ........ C08G 69/00; C08K 13/02; C08K 3/346; C08K 5/098; C08K 5/544
See application file for complete search history.

(56) References Cited

U.S. PATENT DOCUMENTS

| 2011/0305871 A1 | 12/2011 | Tabuchi et al. |
| 2014/0010980 A1 | 1/2014 | Hirayama et al. |

FOREIGN PATENT DOCUMENTS

| CN | 103814082 | 5/2014 | |
| JP | 53-42352 | 11/1978 | |
| JP | 58-71949 | 4/1983 | |
| JP | 2004-346240 | 12/2004 | |
| JP | 2007-077309 | 3/2007 | |
| JP | 2013-057003 | 3/2013 | |
| JP | 2015-98581 | 5/2015 | |
| JP | 2015-214159 | 12/2015 | |
| JP | 2017-30977 | 2/2017 | |
| JP | 2018-95852 | 6/2018 | |
| JP | 2018-193547 | 12/2018 | |
| JP | 2018-203984 | 12/2018 | |
| JP | 2019011387 A * | 1/2019 | .............. C08L 77/00 |
| JP | 2019011388 A * | 1/2019 | .............. C08L 77/00 |
| JP | 2019-039061 | 3/2019 | |
| WO | 2010/092921 | 8/2010 | |
| WO | 2013/069365 | 5/2013 | |
| WO | 2015/093450 | 6/2015 | |
| WO | 2018/143110 | 8/2018 | |

OTHER PUBLICATIONS

Sasimowski et al. Influence of the Conditions of Corotating Twin-Screw Extrusion for Talc-Filled Polypropylene on Selected Properties of the Extrudate. Polymers 2019, 11, 1460, pp. 1-18. (Year: 2019).*
English machine translation of JP 2109-011387A. (Year: 2019).*
English machine translation of JP 2019-011388A. (Year: 2019).*
International Preliminary Report on Patentability and Written Opinion issued Sep. 16, 2021 in corresponding International (PCT) Patent Application No. PCT/JP2020/010826.
First Office Action issued Nov. 23, 2022 in corresponding Chinese Patent Application No. 202080020561.1, with English language translation.
International Search Report issued Jun. 2, 2020 in International (PCT) Application No. PCT/JP2020/010826.
Office Action issued May 19, 2023 in corresponding Chinese Patent Application No. 202080020561.1, with English language translation.
Notice of Reasons for Refusal issued Aug. 18, 2023 in corresponding Japanese Patent Application No. 2021-507278, with English language translation.
Notice of Reasons for Refusal issued Feb. 6, 2024 in corresponding Japanese Patent Application No. 2021-507278, with machine English language translation.
Office Action issued Nov. 7, 2023 in corresponding Chinese Patent Application No. 202080020561.1 with English-language translation.
International Search Report issued May 26, 2020 in International (PCT) Application No. PCT/JP2020/010825, which corresponds to copending U.S. Appl. No. 17/440,345.

(Continued)

Primary Examiner — John E Uselding
(74) Attorney, Agent, or Firm — Wenderoth, Lind & Ponack, L.L.P.

(57) ABSTRACT

The present invention is a polyamide resin composition containing 50 to 90% by mass of a crystalline polyamide resin (A) and 9 to 49% by mass of a talc (B), and preferably further containing a coupling agent (C) and a fatty acid metal salt (D), in which an average particle size of secondary particles of the talc (B) in the polyamide resin composition is greater than 30 μm. The polyamide resin composition is less likely to cause a poor appearance of a molded article or occurrence of sink marks, and can stably provide characteristics within desired ranges.

19 Claims, No Drawings

(56) References Cited

OTHER PUBLICATIONS

International Preliminary Report on Patentability issued Sep. 16, 2021 in International (PCT) Application No. PCT/JP2020/010825, which corresponds to copending U.S. Appl. No. 17/440,345.
Decision of Rejection issued Apr. 27, 2023 in Chinese Patent Application No. 202080018467.2, with English translation.
Office Action issued Nov. 23, 2022 in Chinese Patent Application No. 202080018467.2, with English-language translation.
Notice of Reasons for Refusal issued Aug. 10, 2023 in Japanese Patent Application No. 2021-507277, with English language translation.
Notice of Reasons for Refusal issued Dec. 15, 2023 in Japanese Patent Application No. 2021-507277, with English language translation.
Decision of Dismissal of Amendment issued May 8, 2024, in Japanese Application No. 2021-507277, with machine English translation.
Decision of Refusal issued May 8, 2024, in Japanese Application No. 2021-507277, with machine English translation.

\* cited by examiner

POLYAMIDE RESIN COMPOSITION

TECHNICAL FIELD

The present invention relates to a polyamide resin composition, and more particularly to a polyamide resin composition containing a large amount of talc as a reinforcing material.

BACKGROUND ART

As a method for improving dimensional change, rigidity reduction, and a low heat distortion temperature and the like due to water absorption, which are drawbacks of a polyamide resin, blending of fibers such as a glass fiber and a carbon fiber, and inorganic fillers such as a talc and calcium carbonate as a reinforcing material has been widely known for a long time.

When a large amount of particulate inorganic filler such as a talc are blended, a difference in bulk density between the polyamide resin and the particulate inorganic filler is large, which makes it difficult to sufficiently mix them in simple dry blending using a single screw extruder. For this reason, a polyamide resin composition having a desired talc content has been produced by devices such as attaching a coupling agent and water to a polyamide resin, and then dusting the polyamide resin with a talc (for example, Patent Document 1).

However, even when the content of the talc is the same, the appearance of a molded article of a polyamide resin composition may be poor, or sink marks may occur in the molded article. In particular, in the case of an external part, good products cannot be continuously obtained even if molding conditions are changed, which disadvantageously causes an increased defect rate. This has room for improvement at present.

PRIOR ART DOCUMENT

Patent Document

Patent Document 1: JP-B-53-42352

SUMMARY OF THE INVENTION

Problems to be Solved by the Invention

Then, an object of the present invention is to solve the above-mentioned problems, that is, to obtain a polyamide resin composition which is less likely to cause a poor appearance of a molded article of the polyamide resin composition or occurrence of sink marks if the content of the talc is the same, and can stably provide characteristics within desired ranges.

Means for Solving the Problems

In order to solve the above-mentioned problems, the present inventors have intensively studied the aggregation characteristics of talc powder itself, the dispersibility of a talc in a polyamide resin, and the morphology of the polyamide resin composition, and the like. As a result, the present inventors have found that the dispersion and aggregation states of the talc may vary without being in a constant state and that the characteristics of the resin composition are stabilized by adjusting the maximum outer diameter of the aggregate of the talc to a specific value range, and have achieved the present invention.

That is, the present invention relates to:

"[1] a polyamide resin composition comprising 50 to 90% by mass of a crystalline polyamide resin (A) and 9 to 49% by mass of a talc (B), wherein an average particle size of secondary particles of the talc (B) in the polyamide resin composition is greater than 30 μm.

[2] The polyamide resin composition according to [1], wherein the polyamide resin composition further contains a coupling agent (C) and a fatty acid metal salt (D).

[3] The polyamide resin composition according to [1] or [2], wherein the crystalline polyamide resin (A) contains an aliphatic polyamide resin."

The present invention can solve the problem by adopting the above configuration.

Effect of the Invention

A polyamide resin composition of the present invention is a polyamide resin composition containing a large amount of talc, but being less likely to cause a poor appearance of a molded article or occurrence of sink marks, and stably exhibiting characteristics within desired ranges.

MODE FOR CARRYING OUT THE INVENTION

Hereinafter, the present invention will be specifically described.

A crystalline polyamide resin (A) in the present invention is a polyamide resin having an acid amide bond (—CONH—) in the molecule, and has a crystal melting point. The crystalline polyamide resin (A) preferably contains an aliphatic polyamide resin (A1). Specific examples thereof include, but are not limited to, polycaproamide (polyamide 6), polyhexamethylene adipamide (polyamide 66), polytetramethylene adipamide (polyamide 46), polyhexamethylene sebacamide (polyamide 610), polylauryl lactam (polyamide 12), poly-11-aminoundecanoic acid (polyamide 11), copolymers thereof, and blends of these polymers. The aliphatic polyamide resin (A1) is preferably polyamide 6 and polyamide 66, and more preferably polyamide 6.

In addition to the aliphatic polyamide resin (A1), it is preferable that a polyamide resin (A2) that delays the crystallization of the aliphatic polyamide resin (A1) be used in combination with the crystalline polyamide resin (A) in the present invention from the viewpoint of moldability. The polyamide resin (A2) is not particularly limited as long as the polyamide resin (A2) can delay the crystallization of the aliphatic polyamide resin (A1), but for example, a polyamide having a higher crystallization temperature than that of the aliphatic polyamide resin (A1) or a polyamide that morphologically inhibits the crystallization can be used. Specific examples thereof include polyamide MXD6 (polymetaxylylene adipamide), a hexamethylene terephthalate/hexamethylene isophthalate copolymer (6T/6I), 4,4'-diamino-3,3'-dimethyl-dicyclohexylenemethane (CA)/isophthalic acid (I)/lauryl lactam (LL) copolymer (I/CA/LL), and a terephthalic acid (T)/trimethyl-hexamethylenediamine (TMD) polymer (T/TMD). The polyamide resin (A2) is preferably polyamide MXD6 in that the appearance of a molded article can be improved. Polyamide MXD6 is particularly preferable because polyamide MXD6 can improve not only the appearance of the molded article but also the mechanical characteristics thereof.

The content ratios of the aliphatic polyamide resin (A1) and the polyamide resin (A2) are preferably 70 to 99.5 parts by mass and 0.5 to 30 parts by mass respectively, and more preferably 80 to 95 parts by mass and 5 to 20 parts by mass respectively based on 100 parts by mass of the crystalline polyamide resin (A).

The relative viscosity (96% sulfuric acid method) the crystalline polyamide resin (A) is preferably in the range of 1.8 to 3.5, and more preferably in the range of 2.0 to 3.2. The relative viscosity of less than 1.8 tends to cause deteriorated toughness, and the relative viscosity of more than 3.5 tends to cause deteriorated fluidity. The preferable ranges of the relative viscosity are the same for the aliphatic polyamide resin (A1) and the polyamide resin (A2), and when the aliphatic polyamide resin (A1) and the polyamide resin (A2) are used in combination, a weighted average calculated from the respective content ratios is taken as the relative viscosity of the crystalline polyamide resin (A).

The blending (content) amount of the crystalline polyamide resin (A) is 50 to 90% by mass, preferably 55 to 80% by mass, more preferably 56 to 74% by mass, and still more preferably 60 to 68% by mass in the polyamide resin composition. The blending amount of less than 50% by mass makes it difficult to uniformly disperse a talc, which causes unstable performances such as mechanical characteristics. The blending amount of more than 90% by mass causes a small effect of improving impact resistance.

The average particle size of primary particles of a talc (B) in the present invention is preferably 1 to 20 μm, and more preferably 2 to 15 μm. The average particle size of more than the above range tends to cause a deteriorated flexural modulus and appearance of the molded article. Meanwhile, the average particle diameter of less than the above range is apt to cause dispersion failure. The average particle diameter can be determined from a particle diameter value of a cumulative amount of 50 wt % read from a particle size cumulative distribution curve measured by a laser diffraction method (for example, LA 920W manufactured by HORIBA, Ltd.) or a liquid phase precipitation system light transmission method (for example, model CP manufactured by Shimadzu Corporation). In the present invention, the measurement is performed by the former method.

The talc can be obtained by finely crushing a naturally occurring product by mechanical means, and precisely classifying the particles. The naturally occurring product may be classified first roughly and then more precisely. The mechanical crushing method can be performed by using crushers such as jaw, hammer, roll, and jet crushers, and mills such as screen, colloid, roller, and vibration mills. The crushed talc is classified by a wet or dry method once or repeatedly in an apparatus such as a cyclone, a cyclone air separator, a microseparator, a cyclone air separator, or a sharp cut separator in order to have an average particle size adjusted in the present invention. When the talc used in the present invention is produced, it is preferable that the talc be crushed to a specific particle size and then classified using a sharp cut separator in order to obtain the talc having a specific particle size.

The talc in the present invention is a talc particularly requiring no surface treatment or the like, but for the purpose of improving its adhesion to or dispersibility in the polyamide resin, those surface-treated with various organic titanate-based coupling agents, organic silane-based coupling agents, graft-modified polyolefins of unsaturated carboxylic acids or anhydrides thereof, fatty acids, fatty acid metal salts, and fatty acid esters and the like may be used. A granular talc granulated in a granular form using a water-soluble polymer binder may be used.

The blending (content) amount of the talc (B) is 9 to 49% by mass, preferably 19 to 44% by mass, more preferably 25 to 43% by mass, and still more preferably 31 to 39% by mass in the polyamide resin composition. The blending amount of less than 9% by mass causes a small effect of improving mechanical characteristics. The blending amount of more than 49% by mass makes it difficult to provide uniform dispersion in the polyamide resin, whereby the mechanical characteristics and the appearance of the molded article tend to be unstable.

The polyamide resin composition of the present invention preferably contains a coupling agent (C) and a fatty acid metal salt (D) in addition to the crystalline polyamide resin (A) and the talc (B).

As the coupling agent (C), a silane-based coupling agent and a titanate-based coupling agent and the like can be used.

Examples of the silane-based coupling agent include alkoxy group-containing silanes such as methyltrimethoxysilane, octadecyltrimethoxysilane, phenyltrimethoxysilane, and methacryloxypropyltrimethoxysilane; aminosilane-based coupling agents such as aminopropyltrimethoxysilane, aminopropyltriethoxysilane, ureidopropyltriethoxysilane, N-phenylaminopropyltrimethoxysilane, and N-2-(aminoethyl) aminopropyltrimethoxysilane; epoxysilane-based coupling agents such as glycidoxypropyltrimethoxysilane, glycidoxypropyitriethoxysilane, glycidoxypropylmethyldiethoxysilane, glycidylbutyltrimethoxysilane, and (3,4-epoxycyclohexyl) ethyltrimethoxysilane; mercaptosilane-based coupling agents such as mercaptopropyltrimethoxysilane and mercaptopropyitriethoxysilane; and organosilazane compounds such as hexamethyldisilazane, hexaphenyldisilazane, trisilazane, cyclotrisilazane, and 1,1,3,3,5,5-hexamethylcyclotrisilazane.

Examples of the titanate-based coupling agent include tetrakis(2-ethylhexyloxy)titanium, titanium-i-propoxyoctylene glycolate, di-i-propoxy-bis(acetylacetonate)titanium, propanedioxytitanium bis(ethylacetoacetate), tri-n-butoxytitanium monostearate, di-i-propoxytitanium distearate, butyl titanate dimer, titanium octylene glycolate, diisopropoxytitanium bis(triethanolaminate), dihydroxytitanium bislactate, dihydroxybis(ammonium lactate) titanium, bis(dioctyl pyrophosphate)ethylene titanate, bis(dioctyl pyrophosphate)oxyacetate titanate, tri-n-butoxytitanium monostearate, tetra-n-butyl titanate, tetraisopropyl bis(dioctyl phosphite)titanate, tetraoctyl bis(ditridecyl phosphite)titanate, tetra(2,2-diallyloxymethyl-1-butyl) bis(ditridecyl)phosphite titanate, isopropyl trioctanoyl titanate, isopropyl tricumyl phenyl titanate, isopropyl triisostearoyl titanate, isopropyl isostearoyl diacrylic titanate, isopropyl dimethacryloyl isostearoyl titanate, isopropyl tri(dioctyl phosphate)titanate, isopropyl tridodecylbenzene sulfonyl titanate, isopropyl tris(dioctyl pyrophosphate)titanate, and isopropyl tri(N-amidoethylaminoethyl) titanate.

The blending (content) amount of the coupling agent (C) is preferably 0.01 to 1% by mass, more preferably 0.05 to 0.8% by mass, and still more preferably 0.1 to 0.5% by mass in the polyamide resin composition. The blending amount of the coupling agent (C) is preferably 0.1 to 4.0% by mass, and more preferably 0.2 to 2.0% by mass with respect to the talc (B).

The fatty acid metal salt (D) is blended for the purpose of suppressing the aggregation of the talc to exhibit good appearance and physical properties. The fatty acid metal salt (D) is preferably a metal salt of a fatty acid having 9 to 30 carbon atoms. Examples thereof include calcium stearate, magnesium stearate, zinc stearate, calcium behenate, magnesium behenate, zinc behenate, zinc montanate, calcium montanate, magnesium montanate, calcium melisinate, magnesium melisinate, zinc melisinate, calcium cerotate, magnesium cerotate, zinc cerotate, calcium lignocerate, magnesium lignocerate, and zinc lignocerate. Among these metal salts, a calcium salt, magnesium salt, or zinc salt of a fatty acid having 15 to 28 carbon atoms is preferable. In particular, calcium stearate, magnesium stearate, zinc stearate, calcium behenate, magnesium behenate, zinc behenate, zinc montanate, calcium montanate, and magnesium montanate and the like are preferable in terms of performance and ease of availability. These metal salts can be produced by a synthesis method (double decomposition method) in which a carboxylic acid compound and a metal hydroxide are reacted, followed by washing with water, dehydrating, and drying, or a method (direct method) in which the carboxylic acid compound and the metal hydroxide are directly reacted without using water.

The blending (content) amount of the fatty acid metal salt (D) is preferably 0.01 to 2% by mass, more preferably 0.05 to 1.5% by mass, and still more preferably 0.1 to 1% by mass in the polyamide resin composition.

In the polyamide resin composition of the present invention, it is necessary that 50 to 90% by mass of the crystalline polyamide resin (A) and 9 to 49% by mass of the talc (B) (preferably, the talc having an average particle size of primary particles of 20 μm or less) are melt-kneaded, and the average particle size of secondary particles of the talc (B) in the polyamide resin composition is greater than 30 μm. The average secondary particle size is preferably 35 μm or more, and more preferably 40 μm or more. When the average secondary particle size is 30 μm or less, the appearance of the molded article is poor, or sink marks are apt to occur during molding. The average particle size of the secondary particles of the talc (B) in the polyamide resin composition is preferably 60 μm or less, more preferably 50 μm or less, and still more preferably 45 μm or less.

The talc has a nucleating agent effect, and on the surface of the talc in the polyamide resin composition, a crystalline body of the polyamide resin starts to form at a temperature higher than a normal crystallization temperature. When the average secondary particle size of a dispersed phase composed of the component (B) is 30 μm or less, the total surface area of the talc increases, whereby the nucleating agent effect of the talc becomes remarkable, which provides increased crystallinity. Therefore, the solidification of the resin injected into a mold during molding is also accelerated. It is considered that the resin is apt to be solidified before being in close contact with the mold, which causes deteriorated mold transferability to cause a deteriorated appearance of the molded product, and at the same time, the resin is solidified before pressure holding is applied, which is apt to cause sink marks.

A method for measuring the average particle size of the secondary particles is as follows: a molded article obtained by injection-molding a polyamide resin composition is observed with a scanning electron microscope (SEM) at a magnification of 500 times; the maximum lengths of 500 secondary particles having a maximum length larger than the average particle size of the primary particles of the talc (B) are measured; and the average value of the maximum lengths of 100 secondary particles in descending order is calculated.

In addition to the above, it is also possible, as necessary, to further add a light or heat stabilizer, an antioxidant, an ultraviolet absorber, a light stabilizer, a plasticizer, a lubricant, a crystal nucleating agent, a release agent, an anti-static agent, a combination of a halogen-based flame retardant and antimony trioxide, various phosphoric acid-based flame retardants, melamine-based flame retardants, inorganic pigments, organic pigments, and dyes, or other kinds of polymers and the like within a known range, to the polyamide resin composition of the present invention.

Examples of the stabilizer include organic antioxidants, such as hindered phenol-based antioxidants, sulfur-based antioxidants and phosphorus-based antioxidants, and heat stabilizers, hindered amine-based, benzophenone-based, and imidazole-based light stabilizers and ultraviolet absorbers, metal inactivating agents, and copper compounds. As the copper compound, copper salts of organic carboxylic acids such as cuprous chloride, cuprous bromide, cuprous iodide, cupric chloride, cupric bromide, cupric iodide, cupric phosphate, cupric pyrophosphate, copper sulfide, copper nitrate, and copper acetate can be used. Furthermore, as a constituent component other than the copper compound, it is preferable to contain an alkali metal halide compound. Examples of the alkali metal halide compound include lithium chloride, lithium bromide, lithium iodide, sodium fluoride, sodium chloride, sodium bromide, sodium iodide, potassium fluoride, potassium chloride, potassium bromide, and potassium iodide. These additives may be used not only singly but also in combination of several kinds. The optimum added amount of the stabilizer may be selected, but it is possible to add at most 5 parts by mass of the stabilizer to 100 parts by mass of the polyamide resin (A).

As the flame retardant, a combination of a halogen-based flame retardant with a flame retardant aid is preferable. As the halogen-based flame retardant, brominated polystyrene, brominated polyphenylene ether, a brominated bisphenol-type epoxy-based polymer, a brominated styrene maleic anhydride polymer, a brominated epoxy resin, a brominated phenoxy resin, decabromodiphenyl ether, decabromobiphenyl, brominated polycarbonate, perchlorocyclopentadecane, and a brominated cross-linked aromatic polymer and the like are preferable. Examples of the flame retardant aid include layered silicates such as antimony trioxide, antimony pentoxide, sodium antimonate, zinc stannate, zinc borate, and montmorillonite, a fluorine-based polymer, and silicone. Among these, from the viewpoint of thermal stability, it is preferable that the halogen-based flame retardant is dibrom polystyrene, and the flame retardant aid is a combination of any of antimony trioxide, sodium antimonate, and zinc stannate. Examples of a non-halogen-based flame retardant include melamine cyanurate, red phosphorus, a phosphinic acid metal salt, and a nitrogen-containing phosphoric acid-based compound. In particular, a combination of a phosphinic acid metal salt and a nitrogen-containing phosphoric acid-based compound is preferable. The nitrogen-containing phosphoric acid-based compound includes a reaction product or a mixture of melamine or melamine condensate such as melam or melon with polyphosphoric acid. It is preferable to add a hydrotalcite-based compound or an alkali compound as other flame retardant and/or flame retardant aid in order to prevent the metal corrosion of a mold or the like when these flame retardants are used. The optimum added amount of the flame retardant may be selected, but it is possible to add at most 20 parts by mass of the flame retardant to 100 parts by mass of the polyamide resin (A).

In the polyamide resin composition of the present invention, the total of the polyamide resin (A), the talc (B), the coupling agent (C), and the fatty acid metal salt (D) (the coupling agent (C) and the fatty acid metal salt (D) are optional components) accounts for preferably 85% by mass or more, more preferably 90% by mass or more, and still more preferably 95% by mass or more.

A production apparatus for producing the polyamide resin composition of the present invention is not particularly limited as long as the polyamide resin and the talc can be melt-kneaded, but a single screw extruder, a twin screw extruder, a kneader, a Banbury mixer, and a roll and the like, which are well known to those skilled in the art, can be used as long as the melt-kneading can be performed. Among these, a twin screw extruder is preferably used.

As the screw of the twin screw extruder to be used, a full flight screw, a reverse full flight screw, an orthogonal kneading disc, a forward feeding kneading disc, and a reverse feeding kneading disc are appropriately combined. In the present invention, it is preferable to incorporate a forward feeding kneading disc as the screw configuration of the plasticized region.

It is preferable that L/D, which is a ratio of the length L (mm) of the screw to the diameter D (mm) of the same screw, satisfy the relationship of 10≤(L/D)≤100. If other operability has no problems, it is preferable that the ratio L/D be smaller from the viewpoint of the fine dispersion of the talc. When the ratio LID is more than 100, thermal deterioration tends to cause decreased mechanical strength of the resin composition.

The melting temperature of the resin composition during melt-kneading is preferably 180 to 330° C., and more preferably 200 to 300° C. When the melting temperature is lower than 180° C., the resin composition is insufficiently melted, whereby a non-melt gel is apt to frequently form. Conversely, when the melting temperature is higher than 330° C., the resin composition is apt to be thermally deteriorated.

The screw rotation speed N during melt-kneading is preferably 100 to 1,500 rpm, and more preferably 150 to 1,000 rpm. When the screw rotation speed is less than 100 rpm, the biting of the talc into the resin tends to be deteriorated. Conversely, even when the screw rotation speed is more than 1,500 rpm, the resin is apt to be deteriorated by shear heat generation. A discharge amount Q is preferably 5 to 3,000 kg/hr, and more preferably 10 to 2,000 kg/hr. When the discharge amount is less than 5 kg/hr, the dispersibility of the talc tends to decrease. Even when the discharge amount is more than 2,000 kg/hr, the reaggregation of the talc tends to cause deteriorated dispersibility.

Q/N, which is a ratio of the discharge amount Q (unit: kg/hr) to the screw rotation speed N (unit: rpm) during melt-kneading, preferably satisfies 0.01≤(Q/N)≤1, and more preferably 0.05≤(Q/N)≤0.9. When the ratio Q/N is less than 0.01, thermal deterioration tends to cause decreased mechanical strength of the resin composition. The ratio Q/N of more than 1 causes an insufficient transporting force, whereby the talc is apt to spout.

It is also possible to introduce a talc, which is apt to cause biting failure into the polyamide resin, from a side opening of the twin screw extruder during extrusion processing. By introducing the talc through the side opening, the talc stably bites into the resin even when the screw rotates at a high rotation speed. Furthermore, the talc is in contact with the melted resin, whereby shearing with the resin pellet is reduced as in the case of original feeding. Therefore, the talc is less likely to be finely divided to 30 μm or less, and an average secondary particle size of greater than 30 μm is likely to be stably obtained.

As a method for producing the polyamide resin composition of the present invention, when a crystalline polyamide resin (A) and a talc having a particle size of primary particles of 1 to 20 μm are melt-kneaded at a predetermined ratio, a part or the total amount of the talc is preferably supplied from a side opening of a twin screw extruder. When a part of the talc is supplied from the side opening, it is preferable to supply 50% by mass or more and less than 100% by mass of the total amount of the talc from the side opening.

The component (C) may be added simultaneously with a raw material component other than the talc, or may be applied to the talc in advance, and added.

In order to remove a gas component associated with the talc during melt-kneading, it is preferable to perform vacuum degassing in a melt-kneading part after the completion of plasticization.

EXAMPLES

Next, the present invention will be specifically described using Examples and Comparative Examples, but the present invention is not limited thereto.

Characteristics and physical property values shown in the following Examples and Comparative Examples were measured by the following test methods.

1) Average particle size of secondary particles of talc: A cross-sectional cut piece was prepared from a test piece prepared by the following 4) using a microtome, subjected to platinum sputtering, and observed with a scanning electron microscope (SEM) at 500 times. The maximum lengths of 500 secondary particles having a maximum length larger than the average particle size of primary particles of the talc were measured. The average value of the maximum lengths of 100 secondary particles in descending order was calculated as the average particle size of the secondary particles.
2) Flexural deflection rate: measured according to JIS K 7171: 2016.
3) Charpy impact strength: measured according to ISO 179/leA (with notch).
4) Evaluation of appearance of molded article: Using an injection molding machine EC-100 manufactured by Toshiba Machine Co., Ltd., a test piece having a length of 100 mm, a width of 100 mm, and a thickness of 2 mmt was prepared by injection molding with a cylinder temperature set to the melting point of a polyamide resin +20° C. and a mold temperature set to 90° C. The appearance of the test piece was visually evaluated.

Very Good: No lifting of a reinforcing material or sink marks in the entire molded article.

Good: Slight lifting of a reinforcing material or sink marks in the vicinity of a gate or at an end.

Average: Chipping of fine parts of the molded article is observed.

Poor: A large amount of lifting of a reinforcing material or sink marks in the entire molded article.

5) Operational stability: Operational stability during melt-kneading was evaluated according to the following criteria.

Very Good: Continuous operation can be performed without causing the talc to spout from a charging opening or a vent opening.

Average: The talc slightly spouts from a charging opening or a vent opening.

Poor: A large amount of talc spouts from a charging opening or a vent opening, whereby continuous operation cannot be performed.

Raw materials used in Examples and Comparative Examples of the present invention are as follows.

The relative viscosity (RV) of a polyamide resin was measured at 20° C. in a state where 0.25 g of the polyamide resin was dissolved in 25 ml of 96% sulfuric acid, and 10 ml of this solution was placed in an Ostwald viscosity tube.

(A11) Polyamide 6: "GLAMIDE T-840" (RV 2.2, melting point: 223° C.) manufactured by Toyobo Co., Ltd.

(A12) Polyamide 6: "1013B" (RV 2.5, melting point: 224° C.) manufactured by Ube Industries, Ltd.

(A13) Polyamide 6: "T-820" (RV 3.1, melting point: 225° C.) manufactured by Toyobo Co., Ltd.

(B1) Talc: "KST-W" (average particle size: 7 μm, apparent specific gravity: 0.4) manufactured by Shokozan Mining Co., Ltd.

(B2) Talc: "FU-51" (average particle size: 13 μm, apparent specific gravity: 0.3) manufactured by Fukuoka Talc Co., Ltd.

(B3) Talc: "KHP-400B" (average particle size: 19 μm, apparent specific gravity: 1.0) manufactured by Hayashi Kasei Co., Ltd.

(C) Silane-based coupling agent: "KBE-903" (3-aminopropyltriethoxysilane) manufactured by Shin-Etsu Chemical Co., Ltd.

(D1) Fatty acid metal salt: "NP-1500" (magnesium stearate) manufactured by TANNAN KAGAKU KOGYO CO., LTD.

(D2) Fatty acid metal salt: "CS-8CP" (calcium montanate) manufactured by Nitto Chemical Industry Co., Ltd.

(E) Stabilizer: potassium iodide manufactured by Mitsui Chemicals, Inc.

Example 1

Raw materials other than a talc were mixed in advance so as to have a composition shown in Table 1. The mixture was fed from an original feed, and the talc was separately fed from a side feed to a twin screw extruder of L/D 45 (TEX 54 αII manufactured by The Japan Steel Works, Ltd.), followed by melt-kneading. The melt-kneaded product was drawn in a strand form from a die, and then caused to pass through a water tank for cooling and solidifying. The solidified product was cut with a pelletizer to obtain polyamide resin composition pellets. The barrel temperature of the extruder was set to 260° C., and the screw rotation speed, discharge amount, and Q/N of the extruder were set to production conditions in Table 1. The obtained pellets were dried with a hot air dryer until the moisture content was 0.05% or less, and then various characteristics were evaluated. The evaluation results are shown in Table 1.

Comparative Example 1

Raw materials were mixed in advance so as to have a composition shown in Table 1. The mixture was fed from an original feed to a twin screw extruder of L/D 45 (TEX 54 αII manufactured by The Japan Steel Works, Ltd.), followed by melt-kneading. The melt-kneaded product was drawn in a strand form from a die, and then caused to pass through a water tank for cooling and solidifying. The solidified product was cut with a pelletizer to obtain polyamide resin composition pellets. The barrel temperature of the extruder was set to 260° C., and the screw rotation speed, discharge amount, and Q/N of the extruder were set to production conditions in Table 1. The obtained pellets were dried with a hot air dryer until the moisture content was 0.05% or less, and then various characteristics were evaluated. The evaluation results are shown in Table 1.

Example 2 To 8

Comparative Example 2

Pellets were prepared and evaluated in the same manner as in Example 1 except that: a part of a talc was similarly mixed with other raw materials in advance; the mixture was supplied from an original feed; and production conditions in Table 1 were set.

TABLE 1

| | | Unit | Example 1 | Example 2 | Example 3 | Example 4 | Example 5 |
|---|---|---|---|---|---|---|---|
| Composition | (A11) Polyamide 6 (RV 2.2) | Parts By Mass | | | | 57 | |
| | (A12) Polyamide 6 (RV 2.5) | Parts By Mass | 65 | 65 | | | 66 |
| | (A13) Polyamide 6 (RV 3.1) | Parts By Mass | | | 72 | | |
| | (B1) Talc (7 μm, Apparent Specific Gravity: 0.4) | Parts By Mass | | | | 42.3 | |
| | (B2) Talc (13 μm, Apparent Specific Gravity: 0.3) | Parts By Mass | 34.3 | 34.3 | | | 33.8 |
| | (B3) Talc (19 μm, Apparent Specific Gravity: 1.0) | Parts By Mass | | | 27.3 | | |
| | (C) Silane-based Coupling Agent | Parts By Mass | 0.3 | 0.3 | 0.3 | 0.3 | |
| | (D1) Fatty Acid Metal Salt | Parts By Mass | 0.2 | 0.2 | 0.2 | 0.2 | |
| | (D2) Fatty Acid Metal Salt | Parts By Mass | | | | | |
| | (E) Stabilizer | Parts By Mass | 0.2 | 0.2 | 0.2 | 0.2 | 0.2 |
| Production conditions | Discharge Amount | kg/hr | 250 | 250 | 230 | 300 | 300 |
| | Screw Rotation Speed | rpm | 300 | 300 | 340 | 360 | 290 |
| | Q/N | — | 0.8 | 0.8 | 0.7 | 0.8 | 1.0 |
| | Talc Supply Method  Original Feed | Wt % | — | 35 | 40 | 20 | 35 |
| | Side Feed | Wt % | 100 | 65 | 60 | 80 | 65 |
| Evaluation Results | Average Secondary Parcticle Size of Talc | μm | 40 | 36 | 34 | 38 | 36 |
| | Flexural Deflection Rate | % | 3.9 | 3.5 | 4.6 | 3.2 | 3.3 |

TABLE 1-continued

|  |  | Unit | | | | | |
| --- | --- | --- | --- | --- | --- | --- | --- |
|  | Charpy Impact Strength | kJ/m² | 3.9 | 3.8 | 5.0 | 2.5 | 3.2 |
|  | Appearance of Molded Article | — | Very Good | Very Good | Very Good | Very Good | Average |
|  | Operability During Melt-kneading | — | Very Good | Very Good | Very Good | Very Good | Average |

|  |  | Unit | Example 6 | Example 7 | Example 8 | Comparative Example 1 | Comparative Example 2 |
| --- | --- | --- | --- | --- | --- | --- | --- |
| Composition | (A11) Polyamide 6 (RV 2.2) | Parts By Mass |  |  |  |  |  |
|  | (A12) Polyamide 6 (RV 2.5) | Parts By Mass | 66 | 66 | 65 | 64 |  |
|  | (A13) Polyamide 6 (RV 3.1) | Parts By Mass |  |  |  |  | 61 |
|  | (B1) Talc (7 µm, Apparent Specific Gravity: 0.4) | Parts By Mass |  |  |  | 35.3 |  |
|  | (B2) Talc (13 µm, Apparent Specific Gravity: 0.3) | Parts By Mass | 33.5 | 33.3 | 34.3 |  | 38.3 |
|  | (B3) Talc (19 µm, Apparent Specific Gravity: 1.0) | Parts By Mass |  |  |  |  |  |
|  | (C) Silane-based Coupling Agent | Parts By Mass | 0.3 | 0.3 | 0.3 | 0.3 | 0.3 |
|  | (D1) Fatty Acid Metal Salt | Parts By Mass |  |  | 0.2 | 0.2 | 0.2 |
|  | (D2) Fatty Acid Metal Salt | Parts By Mass |  | 0.2 |  |  |  |
|  | (E) Stabilizer | Parts By Mass | 0.2 | 0.2 | 0.2 | 0.2 | 0.2 |
| Production conditions | Discharge Amount | kg/hr | 300 | 300 | 300 | 230 | 180 |
|  | Screw Rotation Speed | rpm | 290 | 290 | 320 | 360 | 380 |
|  | Q/N | — | 1.0 | 1.0 | 0.3 | 0.6 | 0.5 |
|  | Talc Supply Method  Original Feed | | 35 | 35 | 50 | 100 | 55 |
|  | Side Feed | | 65 | 65 | 50 | — | 45 |
| Evaluation Results | Average Secondary Parcticle Size of Talc | µm | 36 | 36 | 31 | 17 | 24 |
|  | Flexural Deflection Rate | % | 3.3 | 3.3 | 3.0 | 2.7 | 2.9 |
|  | Charpy Impact Strength | kJ/m² | 3.2 | 3.2 | 3.4 | 3.3 | 3.8 |
|  | Appearance of Molded Article | — | Average | Very Good | Good | Poor | Poor |
|  | Operability During Melt-kneading | — | Very Good | Very Good | Very Good | Poor | Average |

From the results in Table 1, when the polyamide resin and the talc are contained in predetermined amounts, and the average secondary particle size of the talc is within a predetermined range, a polyamide resin composition providing an excellent molding appearance without lifting of the reinforcing material or sink marks can be obtained, and operational stability is also excellent without the talc spouting during melt-kneading.

INDUSTRIAL APPLICABILITY

The molded article formed from the polyamide composition of the present invention has an excellent molded article appearance without lifting of a reinforcing material or sink marks, and can be applied to a wide range of uses. The molded article is particularly most suitable when the molded article appearance without lifting of the reinforcing material or sink marks is emphasized in automobile interior parts such as a console and a cup holder.

The invention claimed is:

1. A polyamide resin composition comprising 50 to 90% by mass of a crystalline polyamide resin (A) and 9 to 49% by mass of a talc (B), wherein an average particle size of secondary particles of the talc (B) in the polyamide resin composition is greater than 30 µm and not greater than 60 µm, the average particle size of the secondary particles of the talc (B) is an average value determined by a method that includes observing a molded article obtained by injection-molding the polyamide resin composition with a scanning electron microscope at a magnification of 500 times, measuring maximum lengths of 500 secondary particles having a maximum length larger than an average particle size of primary particles of the talc (B), and calculating the average value of the maximum lengths of 100 secondary particles in descending order, and the crystalline polyamide resin (A) comprises polyamide 6.

2. The polyamide resin composition according to claim 1, wherein the polyamide resin composition further contains a coupling agent (C) and a fatty acid metal salt (D).

3. The polyamide resin composition according to claim 1, wherein a content of the crystalline polyamide resin (A) is 55 to 80% by mass.

4. The polyamide resin composition according to claim 1, wherein a content of the crystalline polyamide resin (A) is 56 to 74% by mass.

5. The polyamide resin composition according to claim 1, wherein a content of the crystalline polyamide resin (A) is 60 to 68% by mass.

6. The polyamide resin composition according to claim 1, wherein the crystalline polyamide resin (A) consists of the polyamide 6.

7. The polyamide resin composition according to claim 6, wherein a content of the crystalline polyamide resin (A) is 55 to 80% by mass.

8. The polyamide resin composition according to claim 6, wherein a content of the crystalline polyamide resin (A) is 56 to 74% by mass.

9. The polyamide resin composition according to claim 6, wherein a content of the crystalline polyamide resin (A) is 60 to 68% by mass.

10. The polyamide resin composition according to claim 1, wherein a content of the talc (B) is 19 to 44% by mass.

11. The polyamide resin composition according to claim 1, wherein a content of the talc (B) is 25 to 43% by mass.

12. The polyamide resin composition according to claim 1, wherein a content of the talc (B) is 31 to 39% by mass.

13. The polyamide resin composition according to claim 1, wherein the average particle size of the secondary particles of the talc (B) in the polyamide resin composition is not less than 35 μm.

14. The polyamide resin composition according to claim 1, wherein the average particle size of the secondary particles of the talc (B) in the polyamide resin composition is not less than 40 μm.

15. The polyamide resin composition according to claim 1, wherein the average particle size of the secondary particles of the talc (B) in the polyamide resin composition is not greater than 50 μm.

16. The polyamide resin composition according to claim 1, wherein the average particle size of the secondary particles of the talc (B) in the polyamide resin composition is not greater than 45 μm.

17. The polyamide resin composition according to claim 1, further containing a fatty acid metal salt (D), wherein the fatty acid metal salt (D) is at least one selected from the group consisting of calcium stearate, magnesium stearate, zinc stearate, calcium behenate, magnesium behenate, zinc behenate, zinc montanate, calcium montanate, and magnesium montanate.

18. The polyamide resin composition according to claim 1, further containing a fatty acid metal salt (D), wherein the fatty acid metal salt (D) comprises magnesium stearate.

19. The polyamide resin composition according to claim 1, further containing a fatty acid metal salt (D), wherein the fatty acid metal salt (D) comprises calcium montanate.

* * * * *